Feb. 12, 1935. W. M. BRADSHAW 1,991,076
CLOSURE FOR METERS
Filed March 11, 1933
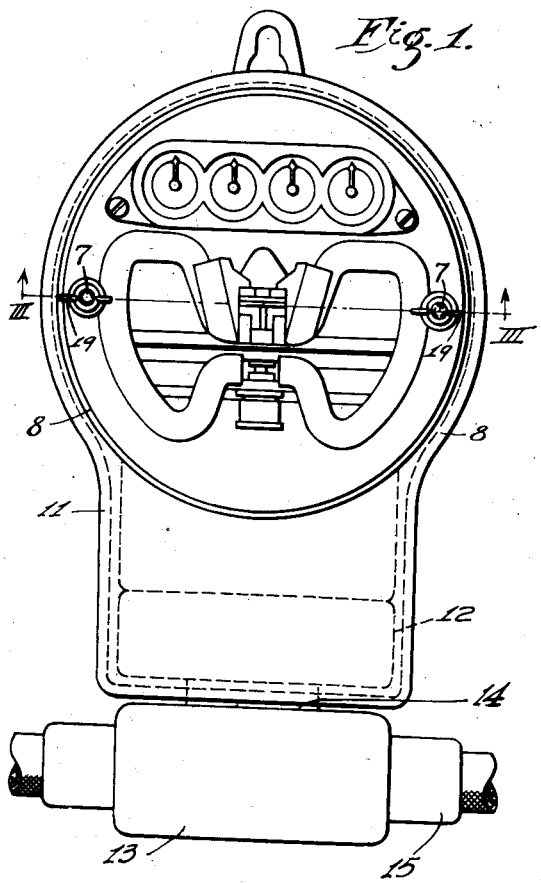
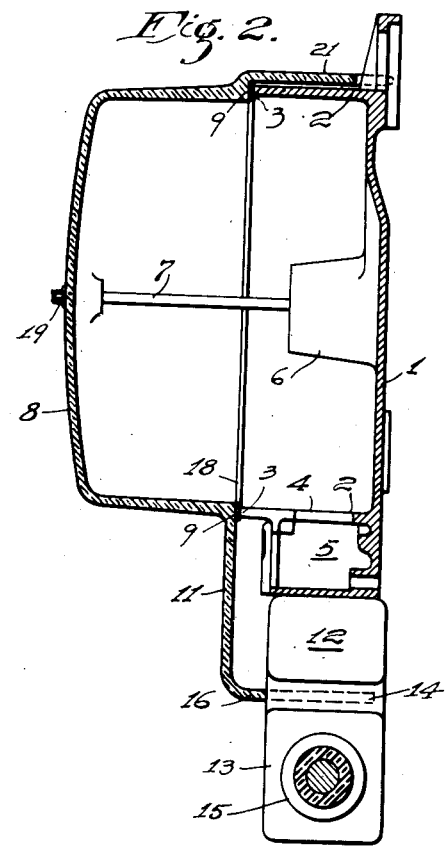
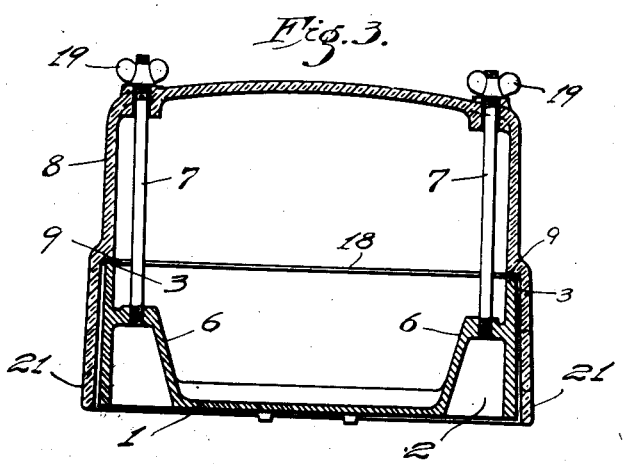
WITNESSES:
INVENTOR
William M. Bradshaw.
BY
ATTORNEY Patented Feb. 12, 1935

1,991,076

UNITED STATES PATENT OFFICE 1,991,076

CLOSURE FOR METERS

William M. Bradshaw, Summit, N. J., assignor to Westinghouse Electric & Manufacturing Company, East Pittsburgh, Pa., a corporation of Pennsylvania Application March 11, 1933, Serial No. 660,349

5 Claims. (Cl. 171—34)

My invention pertains to protective casings for enclosing and supporting electrical meters and more particularly it relates to casings for supporting watthour meters and protecting them from the introduction of foreign matter.

In practice, considerable difficulty is experienced with persons stealing current. This is usually accomplished by making or changing connections at the meter terminal box, or by drilling a hole in the meter casing or cover and introducing a piece of wire or other member to interfere with the rotation of the meter. Previous attempts to solve this difficulty have not been entirely successful and have resulted in a structure involving a greater number of parts, thereby increasing the labor involved in the original installation and the subsequent examination of the meter.

It is accordingly an object of my invention to provide a thief-proof meter casing which effectively prevents tampering with the meter or its connections and which is simple and convenient to install and to open for examination from time to time.

A further object of my invention is to completely cover a watthour meter and its connections with a unitary member made of a transparent fragile material which may be quickly and conveniently removed by an authorized person.

It is also an object of my invention to provide a unitary cover for watthour meters which will be dust-proof and thief-proof.

The invention itself, however, both as to its organization and its method of operation, together with additional objects and advantages thereof, will best be understood from the following description of specific embodiments, when read in conjunction with the accompanying drawing, in which:

Figure 1 is a front elevational view of a watthour meter supported and enclosed in my protective casing, Fig. 2 is a sectional view taken longitudinally through the center of the casing, and Fig. 3 is a sectional view taken laterally through the casing as indicated by line III—III in Fig. 1.

My watthour meter supporting casing comprises a base plate 1 on which a watthour meter mechanism may be supported in any suitable manner which is well known in the art. A side wall 2, rising from the base plate 1, extends peripherally around the rim thereof, and provides a smooth bearing surface 3 along its outer edge. One portion 4 of the peripheral wall is open for the reception of conductors which may extend from the meter into a terminal box 5 adjacent thereto.

Raised pedestals 6 on the base plate 1 threadably receive and support retaining screws 7 for holding the cover 8 in position. The cover 8 is of a transparent fragile substance, such as glass, and is of substantially cup-shape. The cover 8 is provided with a step bearing surface 9 which extends around an intermediate portion of the inner wall of the cover for engagement with the edge of the peripheral wall 2 which rises from the base plate.

An extension 11 projects laterally from the side of the cover 8 to enclose the terminal box 5 and any cable box or conduit fixture which may be associated therewith. The meter may be mounted, as shown, adjacent a cable box 12 comprising a conduit fixture 13 supported by a laterally projecting neck 14 through which the conductors may be extended from a conduit pipe 15. The cover extension 11 is provided with a collar 16 which fits closely about the neck 14 of the conduit fixture 13 thereby completely enclosing the cable box 12 with the meter and its terminal box 5.

To make a close fitting joint and avoid unequal tension between the glass cover 8 and the peripheral side wall 2, a gasket 18 of some resilient material, such as rubber, is interposed therebetween. The cover 8 may be held in place on the base 1 in enclosing and protecting relation over the meter and its connections by means of the usual wing nuts 19 which are threaded to screw onto the outer ends of the retaining studs 7, although any other suitable fastening means may be used.

The wing nuts 19 which hold the cover in place are provided with holes so that the two nuts may be wired together and sealed in the usual manner to prevent removal of the cover by an unauthorized person. The bearing surface 9 on the cover which engages the edge 3 of the peripheral side wall 2 is at an intermediate portion of the cover, and the edge 21 of the glass cover extends further down toward the base plate 1. The edge of the cover 8 is free and preferably lies in the same plane as the base plate 1, thereby preventing interference with the meter by drilling through the side walls or cover or by inserting a member between the cover and the base.

It will be seen that I have provided a simple thief-proof casing for completely enclosing and protecting a watthour meter, and which is convenient to install or remove.

Although I have shown and described a specific embodiment of my invention, I am fully aware that many modifications thereof are possible. My invention, therefore, is not to be restricted except as necessitated by the prior art and the scope of the appended claims.

I claim as my invention:

1. A casing for enclosing and supporting a meter comprising a base plate, peripheral side walls thereon having an open portion for the reception of conductors, a terminal box adjacent thereto, a substantially cup-shaped glass cover having its peripheral edge substantially in the plane of said base plate, a step bearing surface extending around an intermediate portion of said cover, a projecting portion extending laterally from said cover over said terminal box, and means for holding said cover on said base plate with said bearing surface abutting the edge of said peripheral wall.

2. A theft-proof dust-tight enclosure for watthour meters comprising a base plate, peripheral side walls thereon having an open portion for the reception of conductors, an integral terminal box extending laterally therefrom, a cable box adjacent said terminal box, a neck through which cables may be extended into said cable box, a substantially cup-shaped glass cover disposed in inverted position with its peripheral edge substantially in the plane of said base plate, a step bearing surface extending around an intermediate portion of said cover, an integral portion extending laterally from said glass cover over said terminal and cable boxes and having a collar fitting snugly over said neck whereby the meter and its associated terminal and cable boxes are enclosed by a single protecting glass cover which may be readily removed to conveniently expose all said portions, and means for holding said cover firmly on said base plate with said bearing surface abutting the edge of said peripheral walls.

3. The combination of a watthour meter having a baseplate and an integral terminal box projecting laterally therefrom, a cable box adjacent said terminal box, a neck through which cables may be extended into the cable box, a substantially cup-shaped glass cover disposed in inverted position over said meter with its peripheral edge substantially in the plane of said base plate, an integral portion extending laterally from said glass cover over said terminal and cable boxes and having a collar fitting snugly over said neck whereby the meter and its associated terminal and cable boxes are enclosed by a single protecting cover of glass which may be readily removed to conveniently expose all said portions, and means for securing said cover to said base plate.

4. An electric meter construction comprising a supporting base having a terminal chamber projecting laterally therefrom, a meter mechanism mounted on said base, a cover of frangible material constituting, with said base, the sole enclosure for said meter mechanism and covering said terminal chamber, means for securing said cover to said base, and an opening in said cover adjacent said terminal chamber to provide a passage for electrical conductors to said terminal chamber.

5. In an electric meter construction, a base having a terminal chamber projecting laterally therefrom, a meter mechanism mounted on the front of said base, a glass cover substantially of cup-shape constituting with said base, the sole enclosure for said meter mechanism and means for securing it to said base; said cover having a laterally extending portion for covering said terminal chamber and being so proportioned that the peripheral edge of the cover and its laterally extending portion is substantially in the plane of the rear face of said base.

WILLIAM M. BRADSHAW.